US012802031B2

(12) United States Patent
Hatton et al.

(10) Patent No.: US 12,802,031 B2
(45) Date of Patent: Nov. 17, 2026

(54) CENTRAL DEALER DASHBOARD

(71) Applicant: Wells Fargo Bank, N.A., San Francisco, CA (US)

(72) Inventors: Yvette Marie Hatton, El Cerrito, CA (US); Diane C. Parks, Ramsey, NJ (US); Pamela Gould Rashid, Wilmette, IL (US); Matthew Craig Strader, Charlotte, NC (US); Shelli Ulrich, Hilton Head, SC (US)

(73) Assignee: Wells Fargo Banks, N.A., San Francisco, CA (US)

( * ) Notice: Subject to any disclaimer, the term of this patent is extended or adjusted under 35 U.S.C. 154(b) by 76 days.

(21) Appl. No.: 18/776,338

(22) Filed: Jul. 18, 2024

(65) Prior Publication Data

US 2026/0024045 A1 Jan. 22, 2026

(51) Int. Cl.

*G06Q 10/00* (2026.01)
*G06N 20/00* (2019.01)

(Continued)

(52) U.S. Cl.

CPC ........... *G06Q 10/087* (2013.01); *G06N 20/00* (2019.01); *G06Q 40/03* (2023.01)

(58) Field of Classification Search

CPC .. G06Q 10/087; G06Q 40/03; G06Q 10/0875; G06N 20/00

See application file for complete search history.

(56) References Cited

U.S. PATENT DOCUMENTS

| | | | | |
|---|---|---|---|---|
| 5,323,315 A * | 6/1994 | Highbloom | ............ | G06Q 40/02 235/379 |
| 8,214,268 B2 | 7/2012 | Armstrong et al. | | |

(Continued)

FOREIGN PATENT DOCUMENTS

| | | | |
|---|---|---|---|
| CA | 2074337 A1 * | 2/1993 | ............ G06Q 40/02 |
| CA | 3207828 A1 * | 2/2024 | ............ G06Q 20/24 |

OTHER PUBLICATIONS

Ranjan, Shree et al., "A strategic and sustainable multi-criteria decision making framework for ERP selection in OEM," International Journal of Applied Engineering Research 11(3):1916-1926, Mar. 2016, 11 pages.

(Continued)

*Primary Examiner* — Rokib Masud
(74) *Attorney, Agent, or Firm* — Merchant & Gould P.C.

(57) ABSTRACT

An example computer system for generating a central dealer dashboard can include: one or more processors; and non-transitory computer-readable storage media encoding instructions which, when executed by the one or more processors, causes the computer system to generate the central dealer dashboard including: financial information about a dealership, the financial information including a financial account associated with the dealership; credit information about the dealership, the credit information include a credit account associated with the dealership; inventory information about the dealership, the inventory information including inventory held by the dealership; and recommendation information for the dealership, the recommendation information including recommended changes to the financial account, the credit account, or the inventory of the dealership.

16 Claims, 5 Drawing Sheets

(51) Int. Cl.
*G06Q 10/087* (2023.01)
*G06Q 40/03* (2023.01)

(56) References Cited

U.S. PATENT DOCUMENTS

| | | | | |
|---|---|---|---|---|
| 2002/0198808 | A1 | 12/2002 | Myers | |
| 2006/0064344 | A1 | 3/2006 | Lidow | |
| 2017/0236131 | A1 | 8/2017 | Nathenson et al. | |
| 2017/0270574 | A1 | 9/2017 | Hessurg | |
| 2020/0065759 | A1 | 2/2020 | Mcnamara et al. | |
| 2022/0004984 | A1 | 1/2022 | Goodwin | |
| 2022/0067825 | A1 | 3/2022 | Shapiro | |
| 2022/0230125 | A1 | 7/2022 | Vedantam et al. | |
| 2022/0405775 | A1 | 12/2022 | Razavi et al. | |
| 2023/0196235 | A1 | 6/2023 | Turan et al. | |
| 2023/0245234 | A1 | 8/2023 | Sumant | |
| 2024/0054472 | A1 * | 2/2024 | Ambrose | G06Q 20/24 |

OTHER PUBLICATIONS

Lacurezeanu, Alexandru Chris et al., "Integrated Management Solution for a Sustainable SME-Selection Proposal Using AHP," Social Responsibility and Sustainability Accounting: Key Corporate Performance Drivers and Measures, Aug. 2021, 23 pages.

* cited by examiner

CENTRAL DEALER DASHBOARD

BACKGROUND

Dealers typically finance their inventory through arrangements with one or more financial institutions. These arrangements are managed separately from inventory purchasing and tracking from manufactures. Yet other systems are used to manage customer purchases. This disjointed arrangement makes it challenging for dealers to manage these interrelated pieces of the dealership business.

SUMMARY

Examples provided herein are directed to a central dealer dashboard.

According to one aspect, an example computer system for generating a central dealer dashboard can include: one or more processors; and non-transitory computer-readable storage media encoding instructions which, when executed by the one or more processors, causes the computer system to generate the central dealer dashboard including: financial information about a dealership, the financial information including a financial account associated with the dealership; credit information about the dealership, the credit information include a credit account associated with the dealership; inventory information about the dealership, the inventory information including inventory held by the dealership; and recommendation information for the dealership, the recommendation information including recommended changes to the financial account, the credit account, or the inventory of the dealership.

According to another aspect, an example method for generating a central dealer dashboard can include: providing financial information about a dealership, the financial information including a financial account associated with the dealership; providing credit information about the dealership, the credit information include a credit account associated with the dealership; providing inventory information about the dealership, the inventory information including inventory held by the dealership; and providing recommendation information for the dealership, the recommendation information including recommended changes to the financial account, the credit account, or the inventory of the dealership.

The details of one or more techniques are set forth in the accompanying drawings and the description below. Other features, objects, and advantages of these techniques will be apparent from the description, drawings, and claims.

DETAILED DESCRIPTION

This disclosure relates to a central dealer dashboard.

The central dealer dashboard is provided for dealerships that sell products manufactured by one or more manufacturing companies, sometimes referred to as Original Equipment Manufacturers (OEMs). Examples of dealerships include, without limitation, automobile dealerships and boat dealerships.

A typical dealership may interface with several OEMs to purchase and sell inventory. The central dealer dashboard provides a single place for the dealer to access Enterprise Resource Planning (ERP) data (e.g., invoices, customer data), OEM data (e.g. inventory ordering/pricing, incentives, order lead time, other dealer inventory data), and financing data (e.g., account balances, credit lines).

This aggregation of data sets enables unique features, such as insights that leverage all three sources of data, including anticipated shortfall financing, proactive credit line adjustments, Artificial Intelligence (AI)-assisted inventory ordering, and/or product recommendations. The dashboard can further enable the dealership to perform banking functions (e.g., bill pay, credit line management, etc.), inventory management, view and place new orders with OEMs, etc.

There can be various advantages associated with the technologies described herein. For instance, the aggregation of information on the dashboard provides enhanced user interfaces displaying information in unique and efficient manners. Further, the dashboard provides enhanced functionality not possible on previous disparate systems. Finally, the use of AI can enhance the functionality associated with inventory management, thereby resulting in the practical application of the technology.

Figure 1:
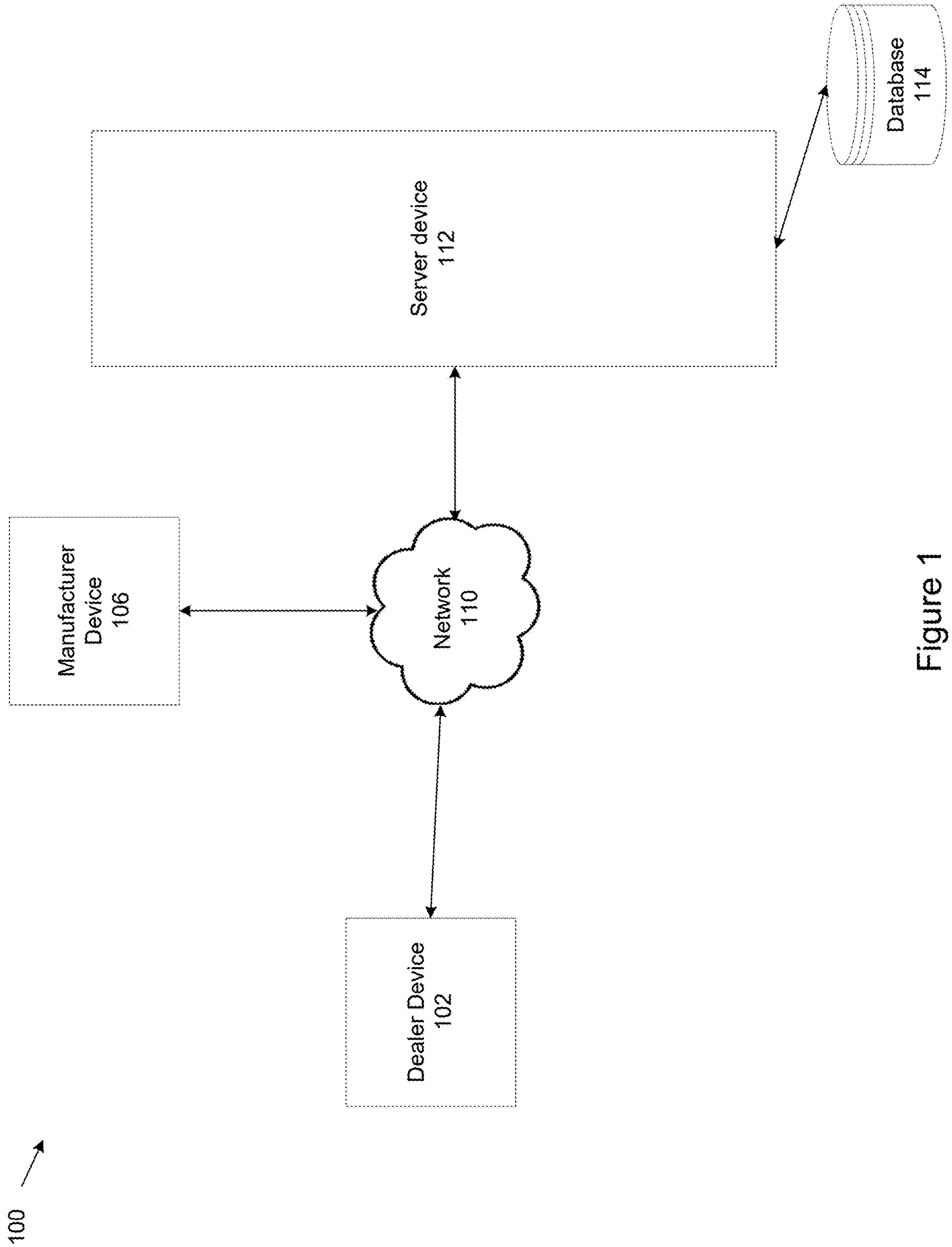
FIG. 1 shows an example system for providing a central dealer dashboard.

FIG. 1 schematically shows aspects of one example system 100 programmed to provide a central dealer dashboard. In this example, the system 100 can be a computing environment that includes a plurality of client and server devices. In this instance, the system 100 includes a dealer device 102, a manufacturer device 106, a server device 112, and a database 114. The dealer device 102 and the manufacturer 106 can communicate with the server device 112 through a network 110 to accomplish the functionality described herein.

Each of the devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The dealer device 102 and the manufacturer device 106 can be programmed to communicate with the server device 112 to provide the central dealer dashboard. Many other configurations are possible.

The example dealer device 102 is programmed to access the central dealer dashboard. For example, the dealer device 102 can be controlled by one or more owners or team members of a dealership to access the central dealer dashboard and perform the functionality described herein. Although a single device is shown, many dealer devices can be used to access the central dealer dashboard.

The example manufacturer device 106 is programmed to provide information associated with the OEM products sold by the dealership. This can include information associated with the purchase and shipping of products, incentives associated therewith, etc. Although a single device is shown, many manufacturer devices can be accessed, such as at least one manufacturer device for each OEM that provides product to the dealership.

The example server device 112 is programmed to provide the central dealer dashboard for the dealer device 102. In one example, the server device 112 provides various information on the dealer dashboard, such as financial information associated with the dealership, inventory management for the dealership, etc. Additional details and functionality associated with the central dealer dashboard are provided below.

The example database 114 is programmed to store data about the dealership. For instance, the database 114 can store customer information for the dealership, financial information for the dealership, inventory information for the dealership, etc. The server device 112 can query the database 114 to store and access such data.

The network 110 provides a wired and/or wireless connection between the devices 102, 106 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Figure 2:
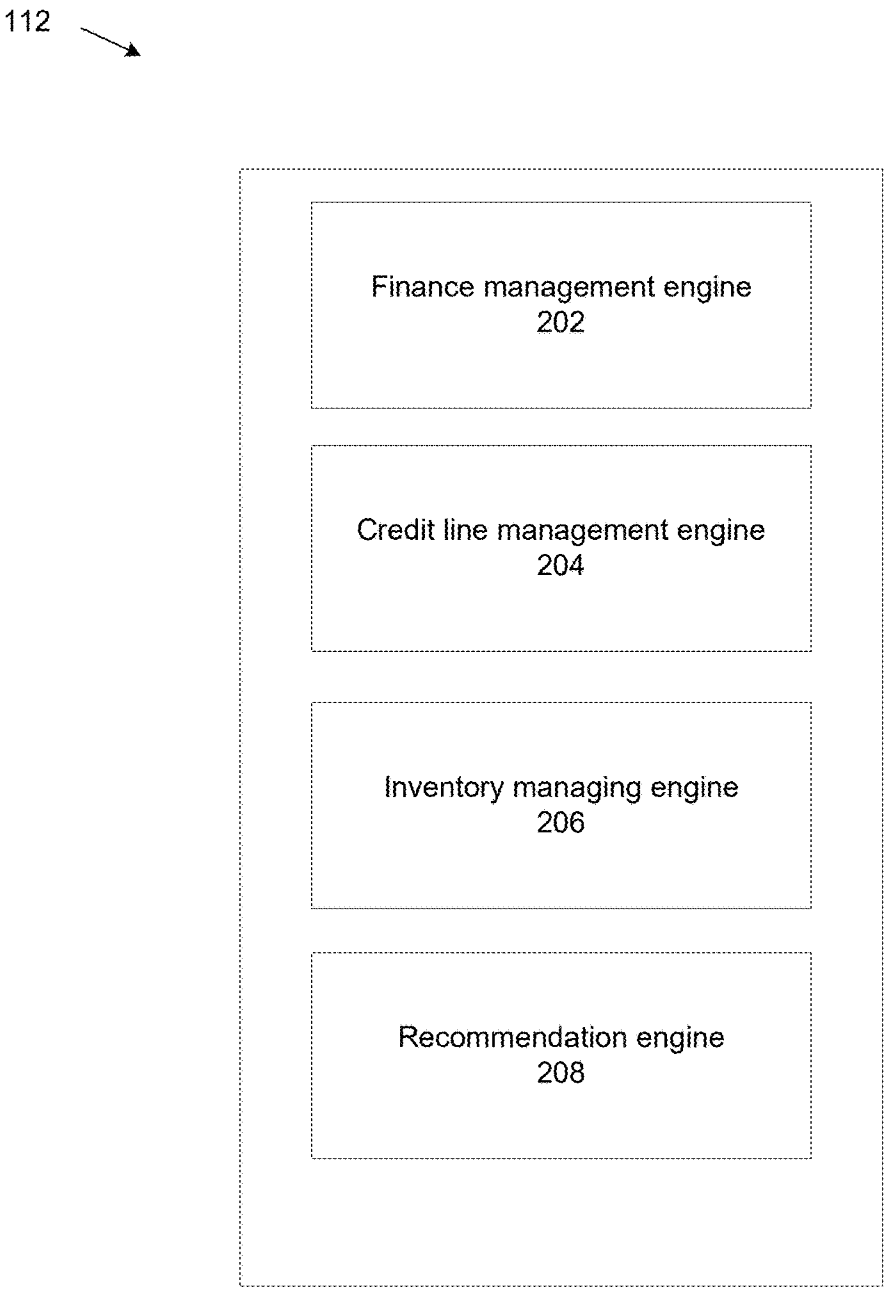
FIG. 2 shows example logical components of a server device of the system of FIG. 1.

Referring now to FIG. 2, additional details of the server device 112 are shown. In this example, the server device 112 has various logical engines that assist in generating the central dealer dashboard. The server device 112 can, in this instance, include a finance management engine 202, a credit line management engine 204, an inventory management engine 206, and a recommendation engine 208. In other examples, more or fewer engines providing different functionality can be used.

The finance management engine 202 is programmed to provide information about the financial accounts for the dealership. This can include, without limitation, access to accounts like checking accounts, savings accounts, lines of credit, etc. The finance management engine 202 allows the dealership to perform traditional banking tasks, such as making payments, transferring funds, etc.

The finance management engine 202 can also be programmed to monitor balances of the accounts and predict cashflow. For instance, the finance management engine 202 can monitor cashflow into and out of the accounts and provide notifications when an account may have a shortfall. One example of this follows: dealership just ordered $2.5M in products from the OEM, but dealership only has $2M available in its financial accounts.

In such a scenario, the finance management engine 202 can work with the financial institution to provide various solutions to address the shortfall. These solutions can include moving funds between accounts or obtaining or increasing a loan to cover the shortfall. The financial institution can suggest products that may help with such issues, as described further below.

The credit line management engine 204 is programmed to proactively manage the credit provided to the dealership. For instance, the credit line management engine 204 can have an overall financial picture of the dealership, with access to the invoice management (ERP), order flow data (OEM), and bank account information (financial institution). The credit line management engine 204 can be programmed to use this information to proactively suggest credit line increases or decreases for a revolving line of credit and interest rate modifications based on the financial health and needs of the dealership.

The inventory management engine 206 is programmed to use AI to assist the dealership in managing its inventory. In some examples, the inventory management engine 206 uses various information from the dealership and/or OEM to assist in the inventory management. Examples of such information include transactional information for the dealership, OEM availability/production capacity from the manufacturer device 106, industry wide sales information, funding information from the finance management engine 202 and credit line management engine 204, etc.

The inventory management engine 206 can utilize various information, such as inventory that has been purchased but not yet delivered to the dealership, as well as shipping and location information. In addition, the inventory management engine 206 can track multiple locations for the dealership and help to optimize inventory for those multiple locations.

More specifically, the inventory management engine 206 can leverage sales and current inventory data, OEM availability and production capacity (ERP), industry-wide analytics (ERP/OEM/financial institution), and available funds/credit (financial institution) to suggest specific product orders to obtain inventory at the appropriate times.

For instance, the inventory management engine 206 can suggest when to order more product based upon the information above, along with contextual information like time of year, historical demand, etc. For instance, the inventory management engine 206 can suggest that the dealership order "X" more boat models because production delays will put delivery in the spring, when the dealership historically needs to sell the boats.

The recommendation engine 208 is programmed to examine the information associated with the dealership (e.g., ERP/OEM/financial information) and make recommendations therefrom. In some examples, the recommendation engine 208 can make such recommendations as different financial products and/or inventory management (e.g., buy or sell products) to optimize the dealership. This can include using AI to analyze information and make such recommendations.

For example, the dealer may not be aware of certain products or OEM offerings that are relevant to that dealer. The recommendation engine 208 can make personalized recommendations for the purchase of these products or OEM offerings based on dealer demographics/information (ERP), product availability (OEM), and financial information (financial institution).

In one example, the recommendation engine 208 is programmed to use AI to make these recommendations based upon information associated with peers of the dealership. For example, the recommendation engine 208 can examine information associated with dealerships of a similar size, location, industry, etc. This can be paired with information about the popularity of certain products using current data, such as size (bigger or smaller boats), cost (cheaper or more expensive products boats); and/or fads (certain boat configurations coming into favor or losing favor).

Further, information can be sourced from financial institutions to determine current and historical sales trends (e.g., demographic and market data). All this information can be fed to the recommendation engine 208 to train the AI and thereupon make recommendations using the recommendation engine 208.

In another example, the recommendation engine 208 is programmed to track incentives associated with OEMs and make recommendations therefrom. For instance, the recommendation engine 208 can track existing inventory for the dealership, new product orders, and incentives from the OEMs. The recommendation engine 208 can make product purchase recommendations based upon that information.

The recommendation engine 208 can also look at payment terms and make suggestions, such as suggesting making purchases using cash versus credit, showing the dealership the various positions and advantages therefrom. The recommendation engine 208 can continuously monitor the position of the dealership based upon input from the finance management engine 202, the credit line management engine 204, and/or the inventory management engine 206 to validate and update the recommendations.

Other considerations made by the recommendation engine 208 can include current economic factors, inventory selling points, service levels for products, changes in financing, etc. The recommendation engine 208 can recommend the sale or purchase of inventory from other dealerships as another way to optimize the dealership inventory and profit. Finally, the incentives for the customer (as well as the OEMs, as noted above) are considered.

In yet another example, the recommendation engine 208 is programmed to access financial products from the financial institution and make recommendations therefrom. For instance, the financial institution may provide certain incentives on products, such as loan products with favorable terms that would allow the dealership to purchase additional or different inventory. The recommendation engine 208 can provide recommendations for those financial products, particularly if there is a shortfall of financing as described above. Many configurations are possible.

Figure 3:
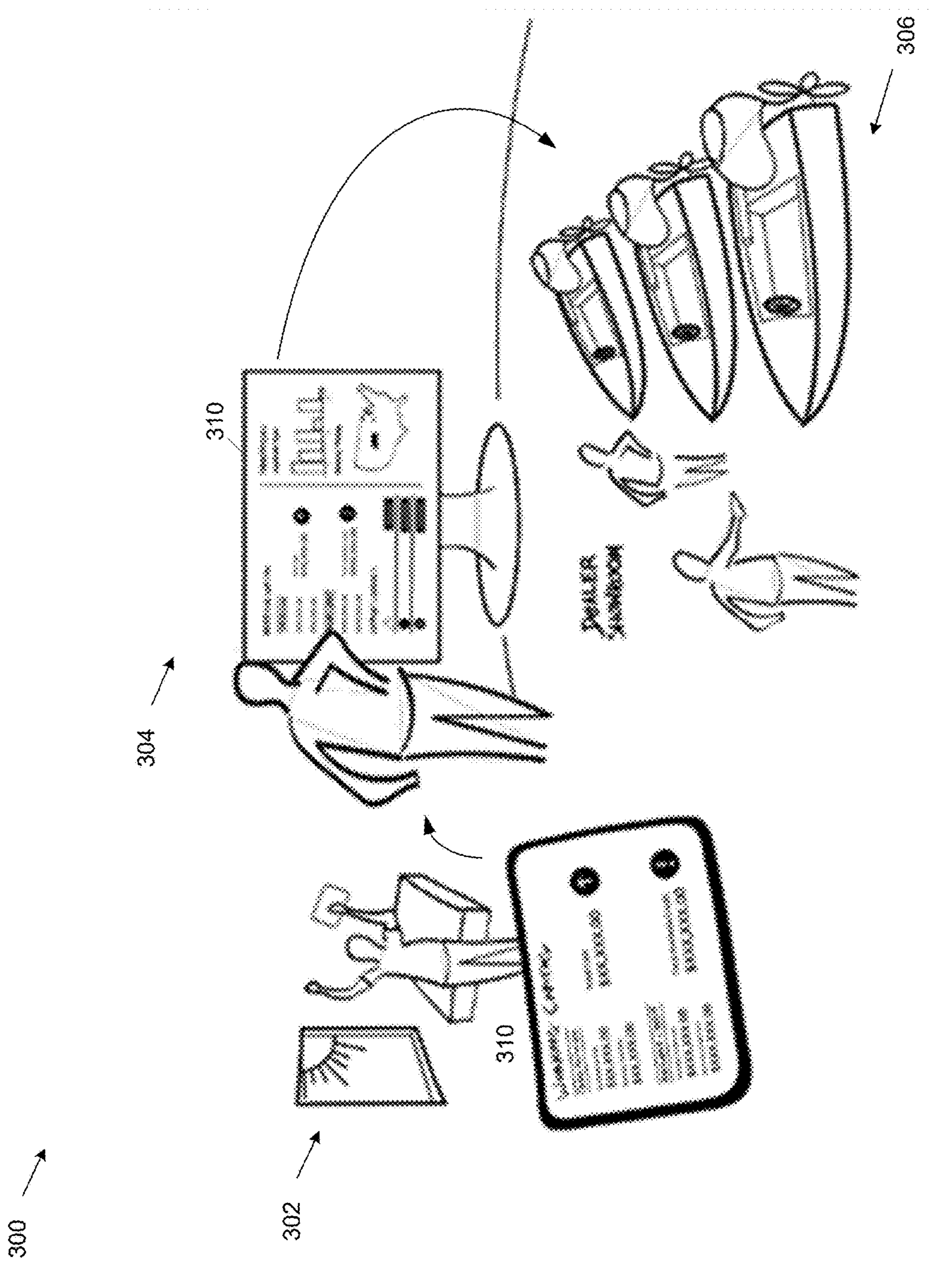
FIG. 3 shows an example method for using the central dealer dashboard generated by the server device of FIG. 2.
Figure 4:
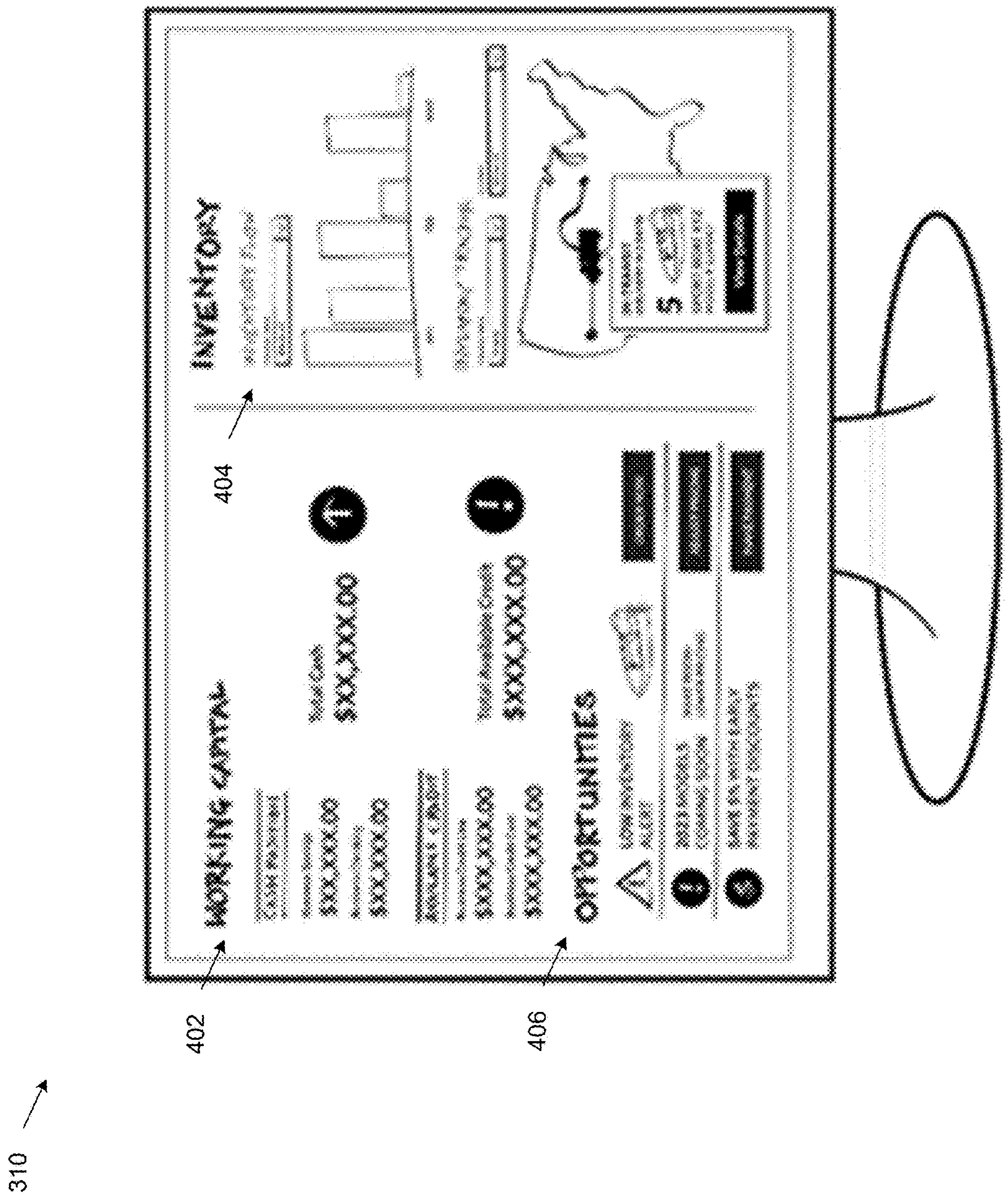
FIG. 4 shows an example central dealer dashboard generated by the server device of FIG. 2.

FIGS. 3 and 4 show an example method 300 for a dealer to use an example central dealer dashboard 310.

At operation 302, the dealership leverages the central dealer dashboard 310 to perform financial tasks, such as checking account balances, making payments, etc. For instance, the central dealer dashboard 310 includes a financial section 402, as generated by the finance management engine 202 and the credit line management engine 204, to allow the dealer to access the various accounts of the dealership. This can include providing the cash positions for each account and a total cash position for all accounts. The financial section 402 can also provide the available credit for each account and the total credit available for the dealership.

At operation 304, the dealership leverages the central dealer dashboard 310 to perform inventory management tasks, such as order inventory, transferring inventory, etc. For instance, the central dealer dashboard 310 includes an inventory section 404, as generated by the inventory management engine 206, to manage the inventory of the dealership. In this example, the inventory section 404 shows an inventory flow that graphically depicts the level of inventory over a given period of time, such as over the last two months.

The inventory section 404 can also include an inventory tracker that depicts where certain inventory is located as the inventory is manufactured, sold, and/or shipped. The inventory section 404 can be controlled to show certain inventory for a particular product, geography, timeframe, etc. In this example, the inventory section 404 shows that five boats are currently in-transit from the OEM to the dealership, with the route depicted on a map.

At operation 306, the inventory management results in the correct inventory at the dealership to optimize profits for the dealership. This can be accomplished, in part, through recommendations at a recommendation section 406 of the central dealer dashboard 310, as generated by the recommendation engine 208. In this example, the recommendation engine 208 generates various recommendations as described above, such as a low inventory alert for a product, a newer model coming out for a product, and an incentive from the OEM for early purchase of a product. The recommendation section 406 allows for easy action on the recommendations by providing a control associated with each recommendation that can be selected to order or manipulate inventory based upon the recommendation.

While the examples provided herein are described from the perspective of a dealership, the principles are equally applicable to other entities. For instance, a central dashboard for OEMs could be configured in a similar manner, only from the perspective of the OEM rather than the dealership.

Figure 5:
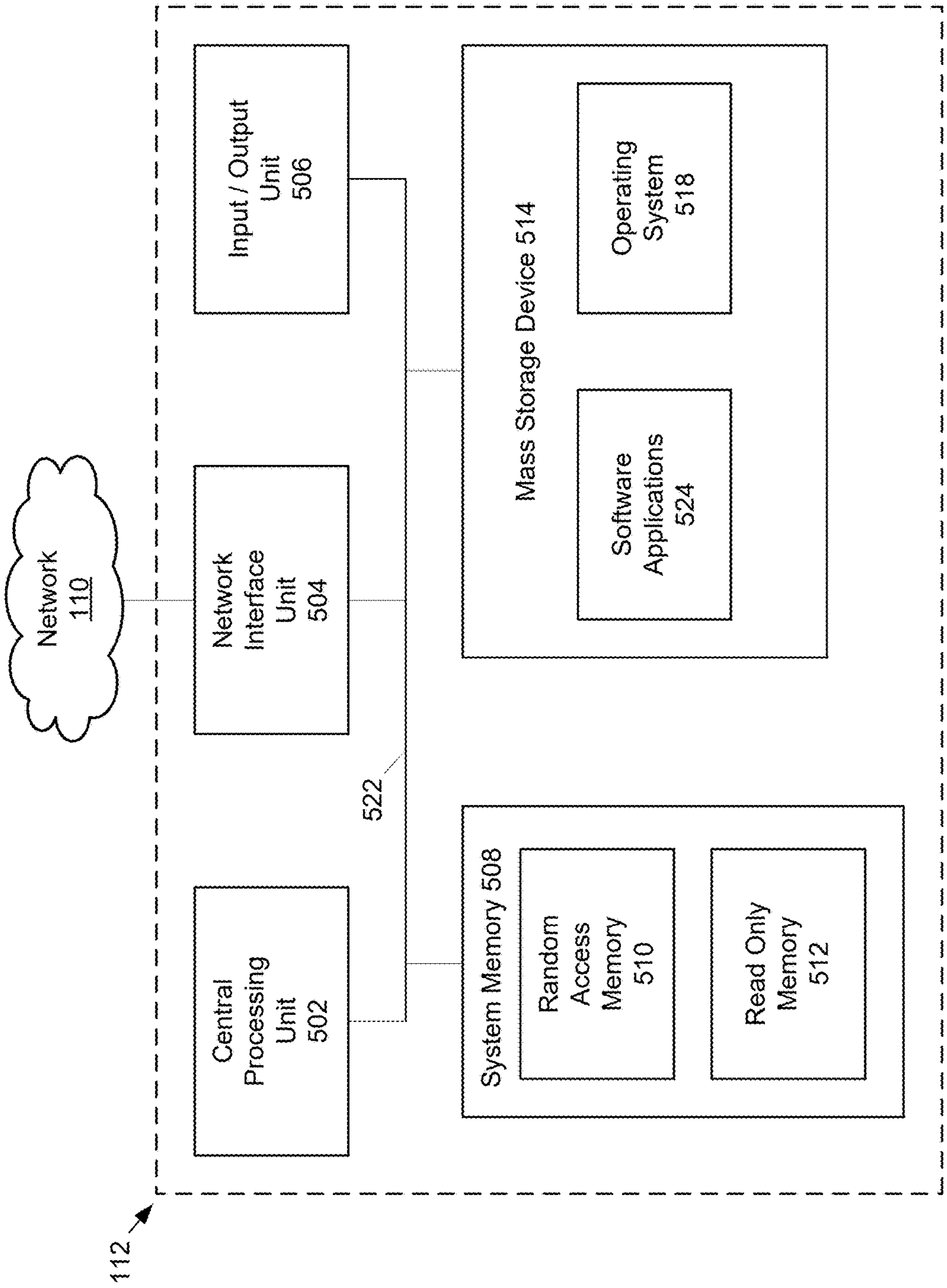
FIG. 5 shows example physical components of the server device of FIG. 2.

As illustrated in the embodiment of FIG. 5, the example server device 112, which provides the functionality described herein, can include at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system containing the basic routines that help transfer information between elements within the server device 112, such as during startup, is stored in the ROM 512. The server device 112 further includes a mass storage device 514. The mass storage device 514 can store software instructions and data. A central processing unit, system memory, and mass storage device similar to that shown can also be included in the other computing devices disclosed herein.

The mass storage device 514 is connected to the CPU 502 through a mass storage controller (not shown) connected to the system bus 522. The mass storage device 514 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 504 connected to the system bus 522. It should be appreciated that the network interface unit 504 may also be utilized to connect to other types of networks and remote computing systems. The server device 112 also includes an input/output controller 506 for receiving and processing input from a number of other devices, including a touch user interface display screen or another type of input device. Similarly, the input/output controller 506 may provide output to a touch user interface display screen or other output devices.

As mentioned briefly above, the mass storage device 514 and the RAM 510 of the server device 112 can store software instructions and data. The software instructions include an operating system 518 suitable for controlling the operation of the server device 112. The mass storage device 514 and/or the RAM 510 also store software instructions and applications 524, that when executed by the CPU 502, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for generating a central dealer dashboard, comprising:

one or more processors; and non-transitory computer-readable storage media encoding instructions which, when executed by the one or more processors, cause the computer system to:

aggregate dealer data, the dealer data including Enterprise Resource Planning data, Original Equipment Manufacturer data, and financing data of a dealership for the central dealer dashboard;

generate the central dealer dashboard using the dealer data, the central dealer dashboard including:

financial information about the dealership, the financial information including a financial account associated with the dealership;

credit information about the dealership, the credit information including a credit account associated with the dealership;

inventory information about the dealership, the inventory information including inventory held by the dealership; and recommendation information for the dealership, the recommendation information including recommended changes to the financial account, the credit account, or the inventory of the dealership;

train artificial intelligence using the dealer data for the dealership;

allow the artificial intelligence to automatically provide the recommendation information of the central dealer dashboard, including to:

recommend a remedy when a balance of the financial account is short;

recommend changes to a credit line associated with the credit account for the dealership; and recommend changes to the inventory, including product orders, based upon the dealer data; and generate an enhanced user interface of the central dealer dashboard that displays, in a single interface, an aggregation of the financial information, the credit information, the inventory information, and the recommendation information based on the Enterprise Resource Planning data, the Original Equipment Manufacturer data, and the financing data, wherein the enhanced user interface includes a recommendation section that displays the recommendation information and provides one or more controls associated with the recommendation information that are selectable to perform an action associated with the recommendation information.

2. The computer system of claim 1, comprising further instructions which, when executed by the one or more processors, causes the computer system to:

provide the balance for the financial account; and allow for the transfer of funds to or from the financial account.

3. The computer system of claim 1, comprising further instructions which, when executed by the one or more processors, causes the computer system to:

monitor a cashflow for the financial account.

4. The computer system of claim 1, wherein the changes include an increase in the credit line.

5. The computer system of claim 1, wherein the changes include adding additional inventory to the dealership.

6. The computer system of claim 1, comprising further instructions which, when executed by the one or more processors, causes the computer system to:

allow the artificial intelligence to recommend one or more financial products for the dealership.

7. The computer system of claim 6, wherein the artificial intelligence recommends a new financial product to fund the dealership.

8. The computer system of claim 6, wherein the artificial intelligence recommends a manufacturer incentive for a product for the dealership.

9. A method for generating a central dealer dashboard, comprising:

aggregating dealer data, the dealer data including Enterprise Resource Planning data, Original Equipment Manufacturer data, and financing data of a dealership for the central dealer dashboard;

generating the central dealer dashboard using the dealer data, including:

providing financial information about the dealership, the financial information including a financial account associated with the dealership;

providing credit information about the dealership, the credit information including a credit account associated with the dealership;

providing inventory information about the dealership, the inventory information including inventory held by the dealership; and providing recommendation information for the dealership, the recommendation information including recommended changes to the financial account, the credit account, or the inventory of the dealership;

training artificial intelligence using the dealer data for the dealership;

allowing the artificial intelligence to automatically provide the recommendation information of the central dealer dashboard, including:

recommending a remedy when a balance of the financial account is short;

recommending changes to a credit line associated with the credit account for the dealership; and recommending changes to the inventory, including product orders, based upon the dealer data; and generating an enhanced user interface of the central dealer dashboard that displays, in a single interface, an aggregation of the financial information, the credit information, the inventory information, and the recommendation information based on the Enterprise Resource Planning data, the Original Equipment Manufacturer data, and the financing data, wherein the enhanced user interface includes a recommendation section that displays the recommendation information and provides one or more controls associated with the recommendation information that are selectable to perform an action associated with the recommendation information.

10. The method of claim 9, further comprising:
providing the balance for the financial account; and
allowing for the transfer of funds to or from the financial account.

11. The method of claim 9, further comprising:
monitoring a cashflow for the financial account.

12. The method of claim 9, wherein the changes include an increase in the credit line.

13. The method of claim 9, wherein the changes include adding additional inventory to the dealership.

14. The method of claim 9, further comprising:
allowing the artificial intelligence to recommend one or more financial products for the dealership.

15. The method of claim 14, wherein the artificial intelligence recommends a new financial product to fund the dealership.

16. The method of claim 14, wherein the artificial intelligence recommends a manufacturer incentive for a product for the dealership.

* * * * *